United States Patent
Ikeda

(10) Patent No.: US 9,970,783 B2
(45) Date of Patent: May 15, 2018

(54) MAGNETIC ROTATION ANGLE SENSOR THAT CORRECTS FOR MAGNETIC POLE MISALIGNMENT

(71) Applicant: Hitachi Metals, Ltd., Tokyo (JP)

(72) Inventor: Yukio Ikeda, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days. days.

(21) Appl. No.: 15/266,457

(22) Filed: Sep. 15, 2016

(65) Prior Publication Data

US 2017/0254666 A1 Sep. 7, 2017

(30) Foreign Application Priority Data

Mar. 3, 2016 (JP) .................................. 2016-041101

(51) Int. Cl.
*G01D 5/14* (2006.01)
*G01B 7/30* (2006.01)
*G01D 18/00* (2006.01)

(52) U.S. Cl.
CPC ............... *G01D 5/14* (2013.01); *G01D 18/00* (2013.01)

(58) Field of Classification Search
CPC .......... G01D 5/14; G01D 18/00; G01D 5/147; G01D 5/145; G01D 5/2448; G01B 7/023; G01B 7/30; G01B 7/14; G01B 7/003
USPC ................................... 324/207.12
See application file for complete search history.

(56) References Cited

U.S. PATENT DOCUMENTS

| | | | | | |
|---|---|---|---|---|---|
| 7,583,080 | B2* | 9/2009 | Uehira | ............... | B62D 15/0215 324/207.12 |
| 8,564,283 | B2* | 10/2013 | Mita | ..................... | G01D 5/145 324/207.12 |
| 2015/0137800 | A1* | 5/2015 | Hainz | ................ | G01D 5/24452 324/207.12 |

FOREIGN PATENT DOCUMENTS

| | | |
|---|---|---|
| JP | 2012-042352 A | 3/2012 |
| JP | 2014-219312 A | 11/2014 |

* cited by examiner

*Primary Examiner* — Jay Patidar
(74) *Attorney, Agent, or Firm* — Roberts Mlotkowski Safran Cole & Calderon, P.C.

(57) ABSTRACT

A rotation angle sensor includes a ring magnet that is provided around a rotating shaft, a magnetic field sensor that detects magnetic field strengths in radial and tangent directions of the rotating shaft, a rotation angle calculation section that calculates a rotation angle of the rotating shaft based on the magnetic field strengths detected by the magnetic field sensor, a correction value storage section that stores correction values preliminarily set for each magnetic pole or each pair of magnetic poles facing the magnetic field sensor, a facing magnetic pole detecting means that detects the magnetic pole or the pair of magnetic poles facing the magnetic field sensor, and a rotation angle correcting section that extracts correction values corresponding to the magnetic pole or the pair of magnetic poles detected, and corrects a rotation angle calculated in the rotation angle calculation section by using the extracted correction values.

16 Claims, 7 Drawing Sheets

MAGNETIC ROTATION ANGLE SENSOR THAT CORRECTS FOR MAGNETIC POLE MISALIGNMENT

The present application is based on Japanese patent application No. 2016-041101 filed on Mar. 3, 2016, the entire contents of which are incorporated herein by reference.

BACKGROUND OF THE INVENTION

1. Field of the Invention

The invention relates to a rotation angle sensor and a correction method for the rotation angle sensor.

2. Description of the Related Art

A rotation angle sensor using a ring magnet and a magnetic field sensor (magnetic sensor) is known (see e.g., JP-B-5434850 and JP-A-2014-219312). The rotation angle sensor is used as e.g. a steering angle sensor mounted on a vehicle to detect steering angles of a steering wheel.

The ring magnet of the rotation angle sensors is disposed around a rotating shaft, whose rotation angle is detected, so as to be integrally rotated with the rotating shaft. In general, the ring magnet used here is magnetized so as to have plural magnetic poles with different polarities arranged in a circumferential direction.

The magnetic field sensor is placed so as to face the ring magnet in a radial direction of the rotating shaft and is configured to detect magnetic field strengths in radial and tangent directions of the rotating shaft.

The rotation angle sensor is configured to determine the rotation angle of the rotating shaft based on the magnetic field strength in the radial and tangent directions detected by the magnetic field sensor.

SUMMARY OF THE INVENTION

The ring magnet used for rotation angle sensor is manufactured such that a ring-shaped magnet raw material is placed on a jig having plural electromagnets arranged at equal intervals in a circumferential direction and is magnetized by strong magnetic fields of the electromagnets.

If, in the manufacture, the accuracy of the jig (i.e., positional accuracy of the electromagnets) used to magnetize the ring magnet is insufficient or there is misalignment between the magnet raw material and the jig at the time of magnetization, the position (or interval) of the magnetic poles on the manufactured magnetic ring may be misaligned.

The misalignment of the magnetic poles on the ring magnet may cause an error in a detected rotation angle.

The misalignment of the magnetic poles on the ring magnet is unavoidable in the manufacture. Thus, it is desired that the rotation angle sensor can detect a rotation angle with high accuracy even when the magnetic pole on the ring magnet is misaligned.

It is an object of the invention to provide a rotation angle sensor that can detect a rotation angle with high accuracy, as well as a correction method for the rotation angle sensor.

According to an embodiment of the invention, a rotation angle sensor comprises:

a ring magnet that is provided around a rotating shaft subjected to rotation angle detection so as to be integrally rotated with the rotating shaft and is magnetized so as to have not less than one pair of magnetic poles with different polarities arranged in a circumferential direction;

a magnetic field sensor that is provided so as to face the ring magnet in a radial direction of the rotating shaft and detects magnetic field strengths in radial and tangent directions of the rotating shaft;

a rotation angle calculation section that calculates a rotation angle of the rotating shaft based on the magnetic field strengths detected by the magnetic field sensor;

a correction value storage section that stores correction values preliminarily set for each magnetic pole, or each pair of magnetic poles, facing the magnetic field sensor;

a facing magnetic pole detecting means that detects the magnetic pole or the pair of magnetic poles facing the magnetic field sensor; and a rotation angle correcting section that refers to the correction value storage section, extracts correction values corresponding to the magnetic pole or the pair of magnetic poles detected by the facing magnetic pole detecting means, and corrects a rotation angle calculated in the rotation angle calculation section by using the extracted correction values.

According to an embodiment of the invention, a correction method for a rotation angle sensor, wherein the rotation angle sensor comprises a ring magnet that is provided around a rotating shaft subjected to rotation angle detection so as to be integrally rotated with the rotating shaft and is magnetized so as to have not less than one pair of magnetic poles with different polarities arranged in a circumferential direction, a magnetic field sensor that is provided so as to face the ring magnet in a radial direction of the rotating shaft and detects magnetic field strengths in radial and tangent directions of the rotating shaft, and a rotation angle calculation section that calculates a rotation angle of the rotating shaft based on the magnetic field strengths detected by the magnetic field sensor, comprises:

preliminarily setting correction values for each magnetic pole, or each pair of magnetic poles, facing the magnetic field sensor; and detecting the magnetic pole or the pair of magnetic poles facing the magnetic field sensor and correcting a rotation angle calculated by the rotation angle calculation section by using correction values corresponding to the detected magnetic pole or the detected pair of magnetic poles.

Effects of the Invention

According to an embodiment of the invention, a rotation angle sensor can be provided that can detect a rotation angle with high accuracy, as well as a correction method for the rotation angle sensor.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

An embodiment of the invention will be described below in conjunction with the appended drawings.

Figure 1:
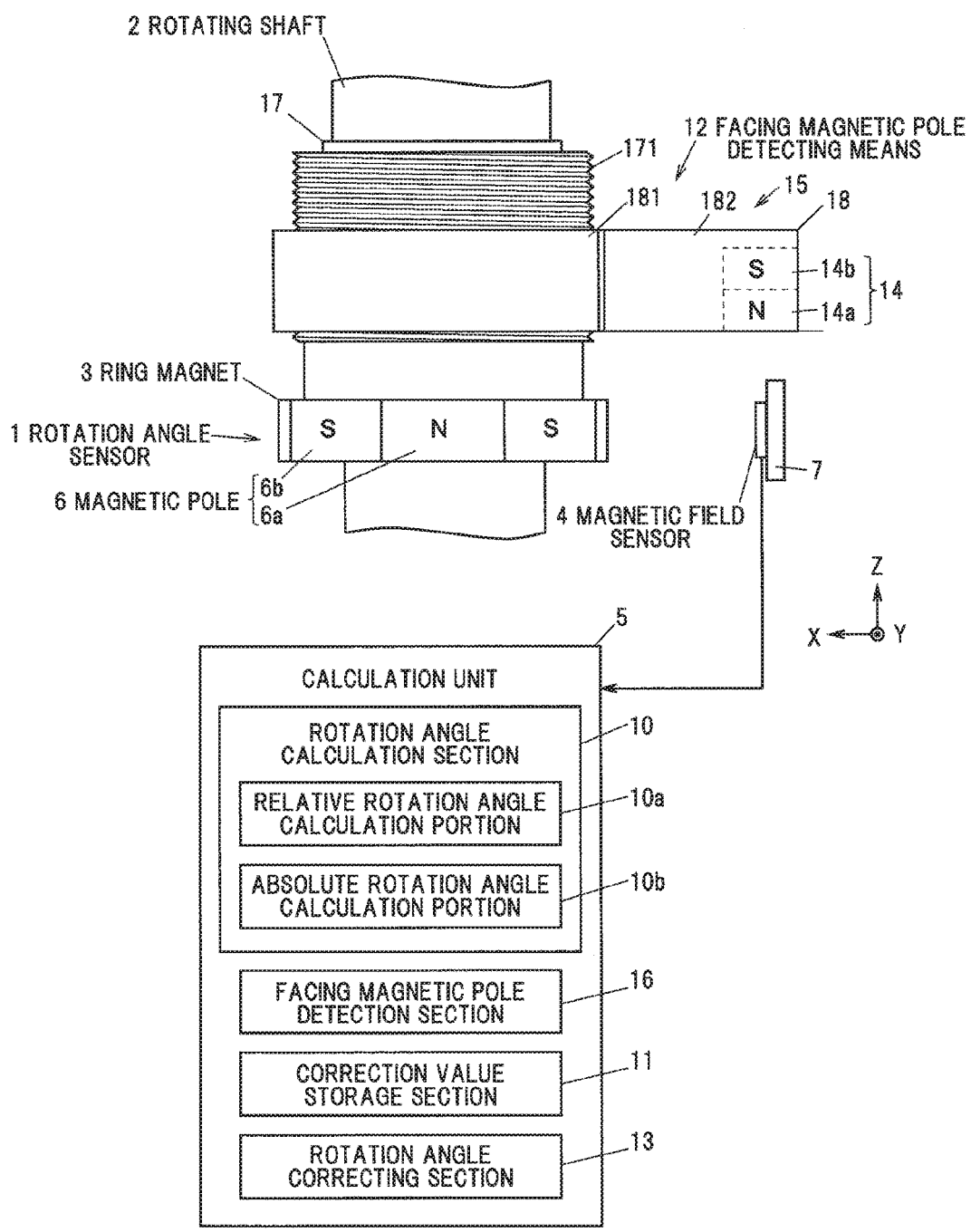
FIG. 1 is an illustration diagram showing a rotation angle sensor in an embodiment of the present invention.
Figure 2:
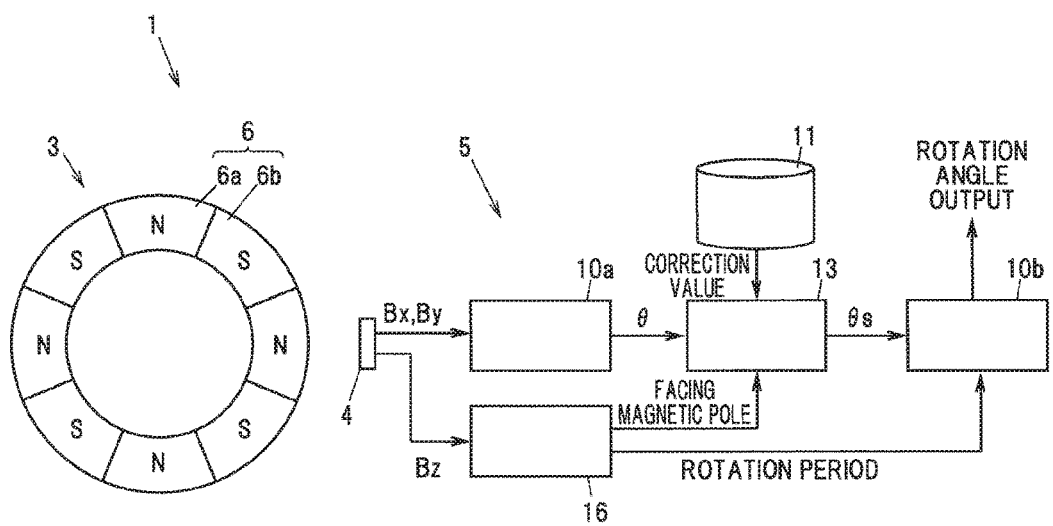
FIG. 2 is an illustration diagram showing a signal flow in the rotation angle sensor.

FIG. 1 is an illustration diagram showing a rotation angle sensor in the present embodiment, and FIG. 2 is an illustration diagram showing a signal flow in the rotation angle sensor.

As shown in FIGS. 1 and 2, a rotation angle sensor 1 is provided with a ring magnet 3 to be provided around a rotating shaft 2 subjected to rotation angle detection in such a manner as to integrally rotate with the rotating shaft 2, a magnetic field sensor 4 for detecting a magnetic field from the ring magnet 3, and a calculation unit 5 for calculating a rotation angle of the rotating shaft 2 based on output from the magnetic field sensor 4.

The rotating shaft 2 is, e.g., a vehicle steering shaft and the rotation angle sensor 1 is, e.g., a steering angle sensor for detecting a steering angle of a steering wheel which is coupled to the steering shaft. However, the intended use of the rotation angle sensor 1 is not limited to the steering angle sensor.

The ring magnet 3 is formed in a hollow cylindrical shape which has a substantially rectangular cross section when taken in a direction perpendicular to a circumferential direction thereof. The ring magnet 3 is magnetized so as to have not less than one pair of magnetic poles 6 with different polarities (each pair consisting of an N-pole 6a and an S-pole 6b) arranged in the circumferential direction, such that the N-pole(s) 6a and the S-pole(s) 6b are alternately arranged at equal intervals in the circumferential direction. Although the example of using the ring magnet 3 having four pairs of magnetic poles 6 (four N-poles 6a and four S-poles 6b) will be described in the embodiment, the number of pairs of magnetic poles 6 on the ring magnet 3 is not limited thereto. In addition, a pair of magnetic poles 6 in the following description means a pair of N-pole 6a and S-pole 6b adjacent in the circumferential direction.

The magnetic field sensor 4 is mounted on a substrate 7 and is positioned to face the ring magnet 3 in a radial direction of the rotating shaft 2. In other words, the magnetic field sensor 4 is positioned to face an outer peripheral surface of the ring magnet 3. The magnetic field sensor 4 is fixed to a non-rotating member which does not rotate with rotation of the rotating shaft 2.

The magnetic field sensor 4, which can detect magnetic field strengths at least in the radial direction (X-direction in FIG. 1) and a tangent direction (Y-direction in FIG. 1) of the rotating shaft 2, is used to detect a magnetic field from the ring magnet 3 facing thereto. In this example, a 3-axis magnetic field sensor which can detect magnetic field strengths in three directions, the radial direction (X-direction in FIG. 1), the tangent direction (Y-direction in FIG. 1) and an axial direction (Z-direction in FIG. 1) of the rotating shaft 2, is used as the magnetic field sensor 4 so that a magnetic field generated by a sliding magnet 14 (described later) can be also detected. As the magnetic field sensor 4, it is possible to use, e.g., a Hall IC which detects magnetic field strength using the Hall effect.

The calculation unit 5 is mounted on an electronic control unit (ECU) of a vehicle and is realized by appropriately combining CPU, memory, software and interface, etc.

The calculation unit 5 has a rotation angle calculation section 10 which calculates a rotation angle of the rotating shaft 2 based on the magnetic field strength detected by the magnetic field sensor 4. The details of the rotation angle calculation section 10 will be described later.

In the present embodiment, the ring magnet 3 having four pairs of magnetic poles 6 is used. Therefore, when the rotating shaft 2 is rotated one revolution, magnetic field strength detected by the magnetic field sensor 4 periodically changes every 90 degrees of angular range which is an angle derived by dividing 360° by four (the number of pairs of magnetic poles 6), as long as the magnetic poles 6 are precisely arranged at equal intervals.

However, if the positions (intervals) of the magnetic poles 6 on the ring magnet 3 are misaligned (are not precise), an angular range corresponding to one period for detecting magnetic field strength by the magnetic field sensor 4 is greater or narrower than 90° and this causes an error in a detected rotation angle.

Therefore, in the present embodiment, correction values (correction coefficient and correction intercept, the details will be described later) corresponding to the misalignment of the magnetic pole 6 is preset for each magnetic pole 6 or each pair of magnetic poles 6 and a rotation angle is corrected by using correction values corresponding to the magnetic pole 6 which is facing the magnetic field sensor 4, so that an error in rotation angle due to misalignment of the magnetic poles 6 is reduced.

In more detail, the rotation angle sensor 1 in the present embodiment is provided with a correction value storage section 11, a facing magnetic pole detecting means 12 and a rotation angle correcting section 13. The correction value storage section 11 stores correction values preliminarily set for each magnetic pole 6, or each pair of magnetic poles 6, facing the magnetic field sensor 4. The facing magnetic pole detecting means 12 detects the magnetic pole 6, or the pair of magnetic poles 6, which is facing the magnetic field sensor 4. The rotation angle correcting section 13 extract, from the correction value storage section 11, correction values corresponding to the magnetic pole 6 or the pair of magnetic poles 6 detected by the facing magnetic pole detecting means 12 and corrects a rotation angle calculated in the rotation angle calculation section 10 using the extracted correction values.

Facing Magnetic Pole Detecting Means 12

The facing magnetic pole detecting means 12 is provided to detect which magnetic pole 6, or which pair of magnetic poles 6, on the ring magnet 3 is facing the magnetic field sensor 4.

In the present embodiment, the facing magnetic pole detecting means 12 has the sliding magnet 14 generating a magnetic field in the axial direction (Z-direction) toward the magnetic field sensor 4, a sliding mechanism 15 for moving the sliding magnet 14 in a direction toward or away from the magnetic field sensor 4 along with the rotation of the rotating shaft 2, and a facing magnetic pole detection section 16 for detecting the magnetic pole 6 or the pair of magnetic poles 6 facing the magnetic field sensor 4 based on the magnetic field strength in the axial direction (Z-direction) detected by the magnetic field sensor 4.

The sliding magnet 14 is arranged to face the magnetic field sensor 4 in the axial direction (Z-direction). The sliding magnet 14 has a bar shape along the axial direction (Z-direction) and is arranged so that magnetic poles with different polarities (an N-pole 14a and an S-pole 14b) are aligned in the axial direction (Z-direction). In this configuration, the magnetic field sensor 4 does not sense magnetic fields in the X- and Y-directions from the sliding magnet 14. In the present embodiment, the sliding magnet 14 is arranged so that the N-pole 14a faces the magnetic field sensor 4.

The sliding mechanism 15 is provided to move the sliding magnet 14 in the axial direction (Z-direction) along with the rotation of the rotating shaft 2. The sliding mechanism 15 has a slider 18 as a support member for supporting the sliding magnet 14, and a slide driving member 17 as an annular member which rotates with the rotating shaft 2 and has a helical engaging portion 171 formed on the outer peripheral surface and engaged with the slider 18. The sliding mechanism 15 may have a guide member fixed to the non-rotating member around the rotating shaft 2 to guide the slider 18, even though it is not shown in the drawing. The slide driving member 17 and the slider 18 are formed of, e.g., a non-magnetic metal such as aluminum or austenitic stainless steel, or a non-magnetic material such as hard resin.

The engaging portion 171 is formed by providing a single helical groove on the outer peripheral surface of the slide driving member 17. The engaging portion 171 is formed in an area in which the sliding magnet 14 can be moved in the direction toward or away from the magnetic field sensor 4 by engagement of the engaging portion 171 with the slider 18 also when a steering wheel is rotated to the maximum right and left steering angle.

The slider 18 has an annular ring portion 181 and a support portion 182. The ring portion 181 has a slider-side engaging portion (not shown) which is formed on an inner peripheral surface and is engaged with the engaging portion 171 of the slide driving member 17. The support portion 182 protrudes radially outward from a circumferential portion of the ring portion 181 and supports the sliding magnet 14. If the slide driving member 17 rotates together with the rotating shaft 2, the slider 18 moves vertically due to engagement of the engaging portion 171 with the slider-side engaging portion.

If the sliding magnet 14 supported by the slider 18 moves downward together with the slider 18, a distance between the sliding magnet 14 and the magnetic field sensor 4 is reduced and the magnetic field strength in the Z-direction detected by the magnetic field sensor 4 increases. On the other hand, if the sliding magnet 14 moves upward together with the slider 18, the distance between the sliding magnet 14 and the magnetic field sensor 4 is increased and the magnetic field strength in the Z-direction detected by the magnetic field sensor 4 decreases.

Based on the magnetic field strength in the Z-direction detected by the magnetic field sensor 4, the facing magnetic pole detection section 16 detects which magnetic pole 6, or which pair of magnetic poles 6, on the ring magnet 3 is facing the magnetic field sensor 4. In the present embodiment, the facing magnetic pole detection section 16 is configured to detect a pair of magnetic poles facing the magnetic field sensor 4. The facing magnetic pole detection section 16 is mounted on the calculation unit 5.

In addition, the facing magnetic pole detection section 16 in the present embodiment is configured to also detect a rotation period defined as how many times a periodic change in the magnetic field strength detected by the magnetic field sensor 4 occurs from the reference position as a reference of the rotation angle of the rotating shaft 2. In other words, in the present embodiment, the facing magnetic pole detection section 16 is configured to detect both the pair of magnetic poles 6 facing the magnetic field sensor 4 and the rotation period. Since the rotation period corresponds to the pair of magnetic poles 6 facing the magnetic field sensor 4, it is possible to know the pair of magnetic poles 6 facing the magnetic field sensor 4 by detecting the rotation period.

Rotation Angle Calculation Section 10

The rotation angle calculation section 10 has a relative rotation angle calculation portion 10a and an absolute rotation angle calculation portion 10b.

The magnetic field sensor 4 is arranged to face the outer peripheral surface of the ring magnet 3. Therefore, when the ring magnet 3 rotates, the N-pole 6a and the S-pole 6b on the ring magnet 3 alternately faces the magnetic field sensor 4. As a result, magnetic field strengths in the X- and Y-directions change periodically. In this example, since four pairs of N-pole 6a and S-pole 6b are provided on the ring magnet 3, a change period (the rotation period) of the magnetic field strengths in the X- and Y-directions is 90° (±45°) as long as all magnetic poles 6 are precisely arranged at equal intervals.

The relative rotation angle calculation portion 10a is configured to calculate a relative rotation angle within an angular range in which a given magnetic pole 6 or a given pair of magnetic poles 6 faces the magnetic field sensor 4, based on the magnetic field strengths in the X- and Y-directions detected by the magnetic field sensor 4. In this example, the relative rotation angle calculation portion 10a is configured to obtain a relative rotation angle within an angular range in which a given pair of magnetic poles 6 faces the magnetic field sensor 4, i.e., within a range of 90°, by using the following equation (1):

$$\theta = \tan^{-1}(By/Bx) \quad (1)$$

where Bx is magnetic field strength in the X-direction and By is magnetic field strength in the Y-direction.

The absolute rotation angle calculation portion 10b is provided to calculate an absolute rotation angle from the reference position of the rotating shaft 2, based on the rotation period detected by the facing magnetic pole detection section 16 of the facing magnetic pole detecting means 12 and a relative rotation angle $\theta$ calculated in the relative rotation angle calculation portion 10a.

In the present embodiment, since the relative rotation angle $\theta$ calculated in the relative rotation angle calculation portion 10a is corrected by the rotation angle correcting section 13 (the details will be described later), the absolute rotation angle calculation portion 10b is configured to calculate an absolute rotation angle $\Theta$ from the reference position of the of the rotating shaft 2 by using the following equation (2) based on a relative rotation angle $\theta s$ corrected by the rotation angle correcting section 13 and the rotation period n detected by the facing magnetic pole detection section 16.

$$\Theta = \theta s + n \times 90 \quad (2)$$

The absolute rotation angle calculation portion 10b outputs the obtained absolute rotation angle $\Theta$ to, e.g., an electric power steering system of a vehicle.

Rotation Angle Correcting Section 13 and Correction Value Storage Section 11

The relative rotation angle $\theta$ calculated in the relative rotation angle calculation portion 10a of the rotation angle calculation section 10 is based on the assumption that each angular range in which a pair of magnetic poles 6 faces the magnetic field sensor 4 is 90° (±45°). Therefore, if an angular range in which a given pair of magnetic poles 6 faces the magnetic field sensor 4 is greater or narrower than 90°, there is an error between the calculated relative rotation angle θ and an actual rotation angle.

Therefore, in the present embodiment, the rotation angle correcting section 13 is configured to correct the relative rotation angle θ calculated in the relative rotation angle calculation portion 10a by using the correction values stored in the correction value storage section 11. The rotation angle correcting section 13 and the correction value storage section 11 are mounted on the calculation unit 5.

In the present embodiment, correction values are preliminarily set for each pair of magnetic poles 6 facing the magnetic field sensor 4 and are stored in the correction value storage section 11, and the rotation angle correcting section 13 is configured to extract correction values corresponding to the pair of magnetic poles 6 facing the magnetic field sensor 4 and to correct the relative rotation angle θ calculated in the relative rotation angle calculation portion 10a by using the extracted correction values.

In other words, in the present embodiment, magnetic field strength detected by the magnetic field sensor 4 periodically changes four times in one rotation of the rotating shaft 2. Accordingly, correction values are set for each of the four periods so that the relative rotation angle θ is corrected according to the period in which the magnetic field strength is detected by the magnetic field sensor 4.

Thus, the boundaries between angular ranges (the boundaries between the periods), for each of which correction values are set, can be defined more easily as compared to when correction values are set for each magnetic pole 6 facing the magnetic field sensor 4 (for each half of the above-mentioned 4 periods), and it is possible to reduce an error in rotation angle caused by an error in defining boundaries between the angular ranges and thus possible to obtain a rotation angle with higher accuracy. In addition, it is possible to reduce the number of correction values to be stores in the correction value storage section 11 of the magnetic field sensor 4 as compared to when correction values are set for each magnetic pole 6 facing the magnetic field sensor 4 (for each half of the above-mentioned 4 periods), allowing calculation of a rotation angle in the rotation angle calculation section 10 to be performed more easily. In case that the ring magnet has only one pair of magnetic poles 6, it is desirable to set correction values for each magnetic pole 6 facing the magnetic field sensor 4 (for each 180° angular range).

In the present embodiment, based on a relation between a rotation angle calculated in the rotation angle calculation section 10 and an error as a difference of the rotation angle from an actual rotation angle which is obtained and then approximated by a straight line, a correction coefficient, which is set so that the approximate line has a slope of 0, and a correction intercept, which is set so that an intercept of the approximate line is 0, are preliminarily set for each angular range (each 90° angular range) in which a pair of magnetic poles 6 faces the magnetic field sensor 4, and are stored as the correction values in the correction value storage section 11. A specific procedure to obtain the correction coefficient and the correction intercept will be described later.

In the present embodiment, the rotation angle correcting section 13 is configured to correct the relative rotation angle θ by multiplying the relative rotation angle θ calculated in the relative rotation angle calculation portion 10a by the correction coefficient and then adding the correction intercept.

Now, a control flow in the rotation angle sensor 1 will be described in reference to FIG. 3.

Figure 3:
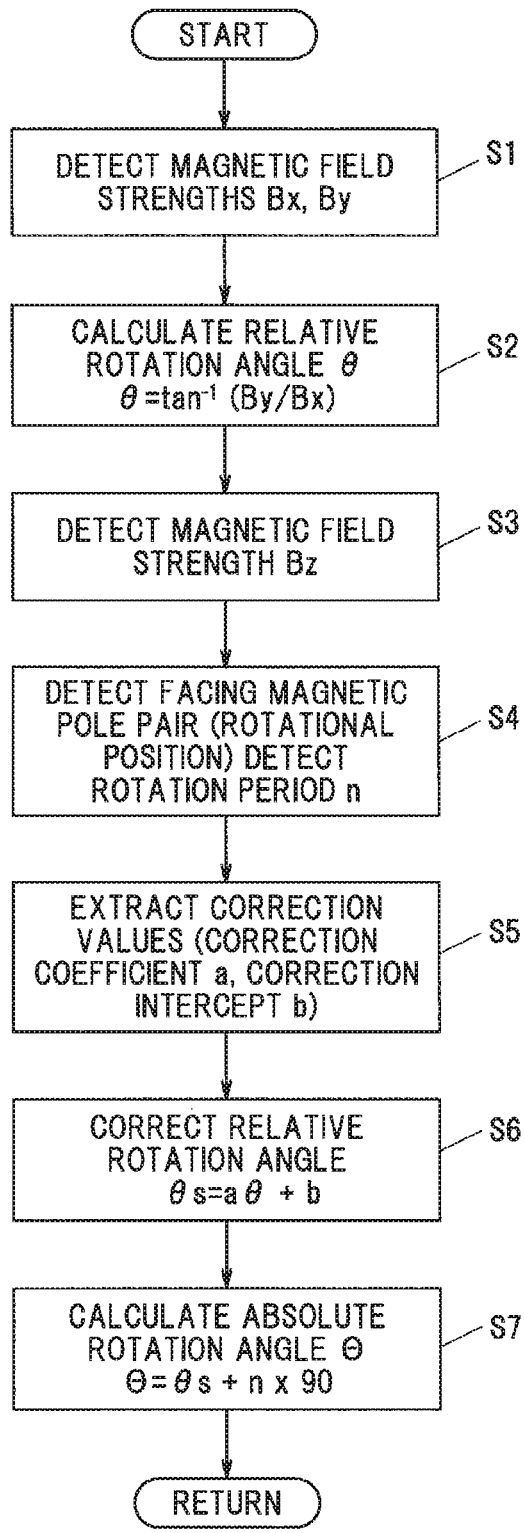
FIG. 3 is a flowchart showing a control flow in the rotation angle sensor.

As shown in FIG. 3, firstly, magnetic field strength Bx in the X-direction (radial direction) and magnetic field strength By in the Y-direction (tangent direction) are detected by the magnetic field sensor 4 in Step S1.

Then, in Step S2, the relative rotation angle calculation portion 10a calculates a relative rotation angle θ using the equation (1) based on the magnetic field strengths Bx and By detected in Step S1.

After that, in Step S3, magnetic field strength Bz in the Z-direction (axial direction) is detected by the magnetic field sensor 4. Following this, in Step S4, the facing magnetic pole detection section 16 of the facing magnetic pole detecting means 12 detects the pair of magnetic poles 6 facing the magnetic field sensor 4 and the rotation period n. Steps S1 and S2 may be processed in parallel to Steps S3 and S4.

After that, in Step S5, the rotation angle correcting section 13 extracts, from the correction value storage section 11, correction values (correction coefficient a and correction intercept b) corresponding to the pair of magnetic poles 6 detected in Step S4 (the pair of magnetic poles 6 which is facing the magnetic field sensor 4).

Then, in step S6, the rotation angle correcting section 13 calculates a corrected relative rotation angle θs by multiplying the relative rotation angle θ obtained in Step S2 by the correction coefficient a extracted in Step S5 and then adding the correction intercept b.

Then, in Step S7, the absolute rotation angle calculation portion 10b calculates an absolute rotation angle Θ from the reference position of the rotating shaft 2 using the equation (2) based on the rotation period n obtained in Step S4 and the corrected relative rotation angle θs obtained in Step S6. The absolute rotation angle calculation portion 10b outputs the calculated absolute rotation angle Θ to, e.g., an electric power steering system.

Correction Value Setting Procedure

Next, a procedure for setting correction values will be described in reference to FIG. 4.

Figure 4:
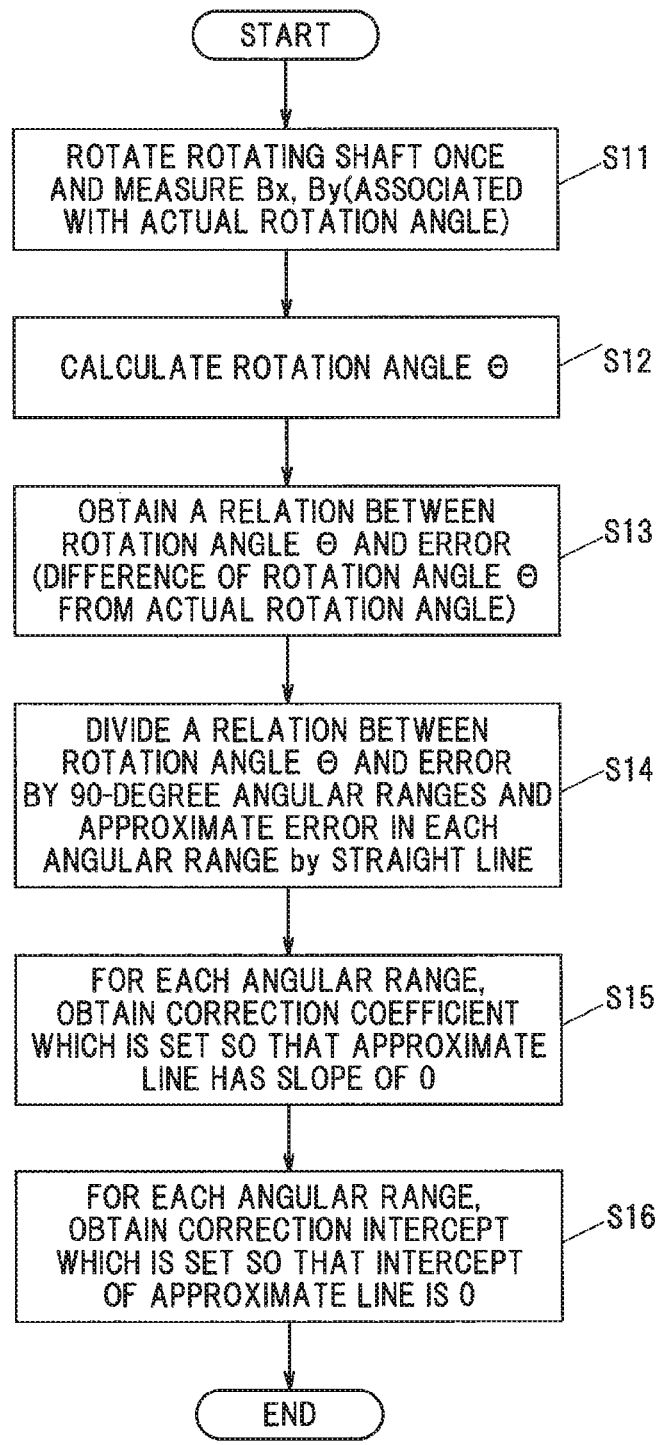
FIG. 4 is a flowchart showing a procedure to determine correction values.

Prior to the procedure shown in FIG. 4, the rotation angle sensor 1 is set up by attaching the ring magnet 3 to the rotating shaft 2 and arranging the magnetic field sensor 4 in position.

After that, as shown in FIG. 4, the rotating shaft 2 is rotated one revolution and the magnetic field strengths Bx and By are detected by the magnetic field sensor 4 in Step S11. At this time, the measured magnetic field strengths Bx and By are associated with an actual rotation angle.

Then, a rotation angle Θ is calculated by the rotation angle calculation section 10 in Step S13. Any correction is not made by the rotation angle correcting section 13 at this stage.

Figure 5:
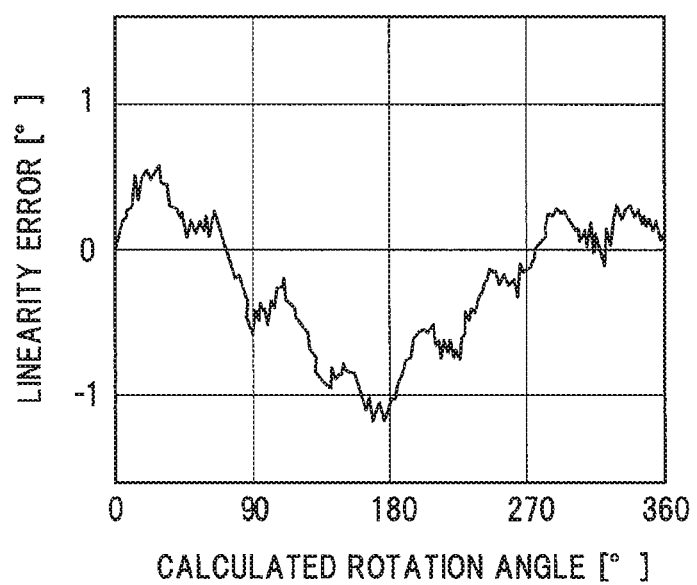
FIG. 5 is a graph showing an example of a relation between a rotation angle and an error.

Then, in Step S13, an error between the rotation angle Θ and the actual rotation angle is determined and a relation between the rotation angle Θ and the error is then obtained. An example of the relation between the rotation angle Θ and the error obtained in Step S13 is shown in FIG. 5.

Figure 6A:
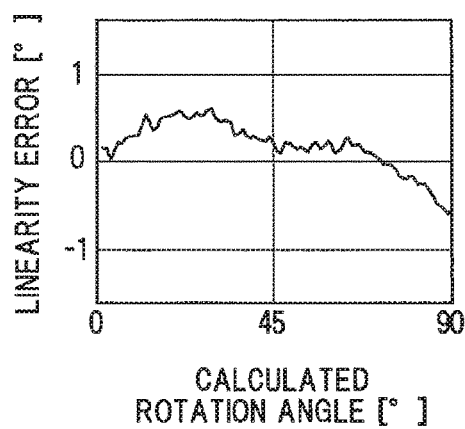
FIG. 6A is a graph showing data extracted from FIG. 5 in an angular range of 0 to 90°.
Figure 6B:
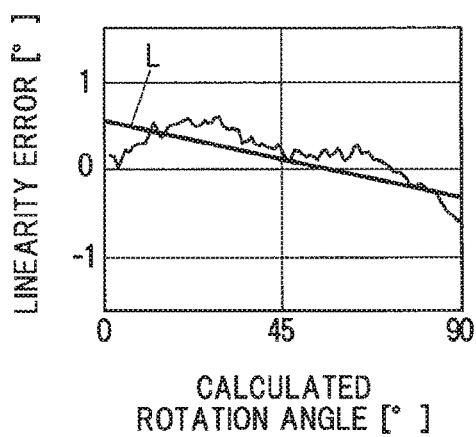
FIG. 6B is a graph showing an approximate line of the extracted data.

Then, in Step S14, the relation between the rotation angle Θ and the error obtained in Step S13 is divided by 90° angular ranges (each of which corresponds to a pair of magnetic poles 6), and the error in each angular range is approximated by a straight line. FIG. 6A shows a graph extracted from FIG. 5 and showing the relation between the rotation angle Θ and the error in an angular range of 0° to 90°, and FIG. 6B shows an approximate line L obtained by approximating the relation shown in FIG. 6A.

Figure 6C:
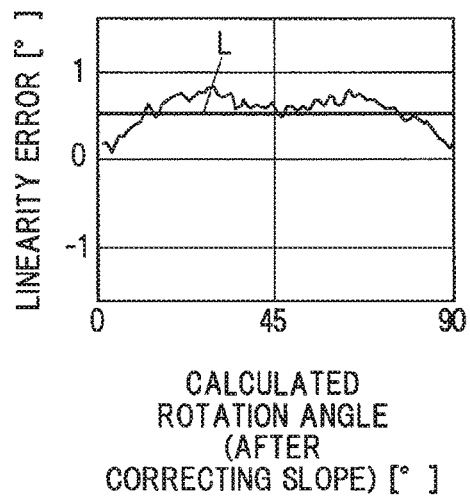
FIG. 6C is a graph in which a horizontal axis indicates values obtained by multiplying the rotation angles in FIG. 6B by a correction coefficient.

Then, in Step S15, the correction coefficient a, with which the approximate line L of the error has a slope of 0, is calculated for each angular range. FIG. 6C shows a graph in which a horizontal axis indicates values obtained by multiplying the relative rotation angle θ of FIG. 6B by the obtained correction coefficient a. When the value obtained by multiplying the relative rotation angle θ by the correction coefficient a is indicated by the horizontal axis, the approximate line L of the error has a slope of 0 as shown in FIG. 6C. In this example, the value of the correction coefficient a is 1.008.

Figure 6D:
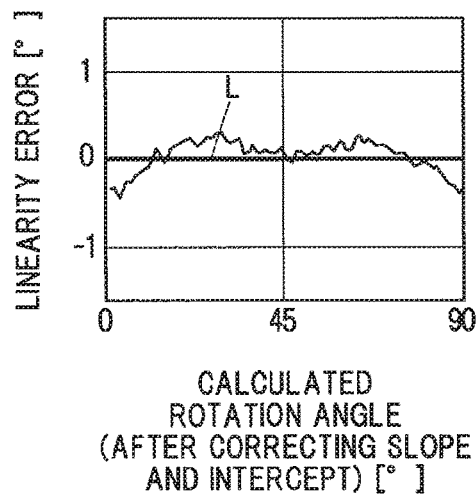
FIG. 6D is a graph in which a horizontal axis indicates values obtained by further adding a correction intercept to FIG. 6D.

Then, in Step S16, the correction intercept b, with which an intercept of the approximate line L of the error is 0, is calculated for each angular range. FIG. 6D shows a graph showing values obtained by further adding the correction intercept b to the horizontal axis of FIG. 6C. When the value obtained by adding the correction intercept b is indicated by the horizontal axis, the intercept of the approximate line L of the error is 0 as shown in FIG. 6D. In this example, the value of the correction intercept b is −0.5°.

Through the above steps, the correction coefficient a and the correction intercept b are obtained for each angular range. The obtained correction coefficient a and correction intercept b are associated with an angular range (a pair of magnetic poles 6 facing the magnetic field sensor 4) and are stored in the correction value storage section 11.

Figure 7:
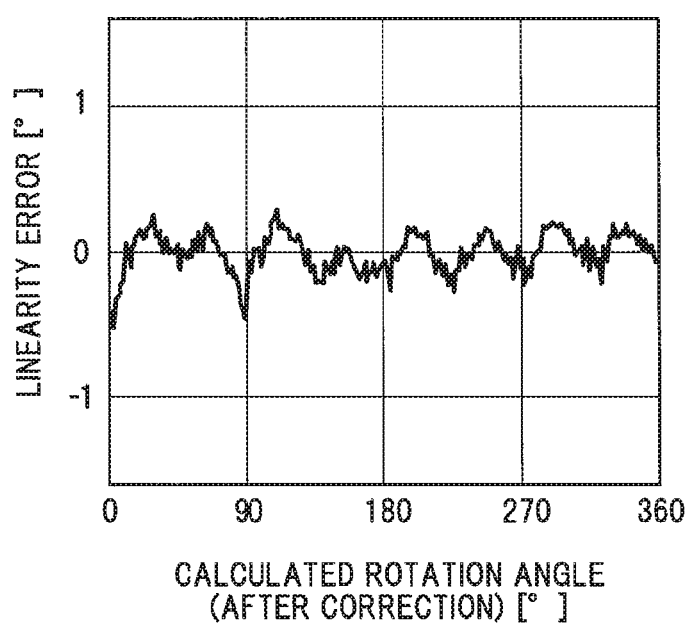
FIG. 7 is a graph in which a horizontal axis indicates rotation angles after making a correction in each angular range of FIG. 5.

FIG. 7 shows a graph in which a horizontal axis indicates rotation angles corrected by the correction values which are determined for each angular range (each 90° angular range) in the example shown in FIG. 5. As understood by comparing FIG. 5 and FIG. 7, an error (difference) from the actual rotation is reduced to very small by correction in the present embodiment and a rotation angle is detected with high accuracy.

Functions and Effects of the Embodiment

As described above, the rotation angle sensor 1 in the present embodiment is provided with the correction value storage section 11 storing correction values preliminarily set for each magnetic pole 6 or each pair of magnetic poles 6 facing the magnetic field sensor 4, the facing magnetic pole detecting means 12 for detecting the magnetic pole 6 or the pair of magnetic poles 6 facing the magnetic field sensor 4, and the rotation angle correcting section 13 which extract, from the correction value storage section 11, correction values corresponding to the magnetic pole 6 or the pair of magnetic poles 6 detected by the facing magnetic pole detecting means 12 and corrects a rotation angle calculated in the rotation angle calculation section 10 using the extracted correction values.

In such a configuration, even when positions (intervals) of the magnetic poles 6 on the ring magnet 3 are misaligned, it is possible to make a correction based on the misalignment of the magnetic poles 6 and it is thereby possible to realize the rotation angle sensor 1 capable of detecting a rotation angle with high accuracy. The rotation angle sensor 1 can detect a rotation angle with high accuracy and is thus suitable especially as a steering angle sensor which is required to detect a steering angle with high accuracy.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

A rotation angle sensor (1), comprising: a ring magnet (3) that is provided around a rotating shaft (2) subjected to rotation angle detection so as to be integrally rotated with the rotating shaft (2) and is magnetized so as to have not less than one pair of magnetic poles (6) with different polarities arranged in a circumferential direction; a magnetic field sensor (4) that is provided so as to face the ring magnet (3) in a radial direction of the rotating shaft (2) and detects magnetic field strengths in radial and tangent directions of the rotating shaft (2); a rotation angle calculation section (10) that calculates a rotation angle of the rotating shaft (2) based on the magnetic field strengths detected by the magnetic field sensor (4); a correction value storage section (11) that stores correction values preliminarily set for each magnetic pole (6), or each pair of magnetic poles (6), facing the magnetic field sensor (4); a facing magnetic pole detecting means (12) for detecting the magnetic pole (6), or the pair of magnetic poles (6), facing the magnetic field sensor (4); and a rotation angle correcting section (13) that refers to the correction value storage section (11), extracts correction values corresponding to the magnetic pole (6) or the pair of magnetic poles (6) detected by the facing magnetic pole detecting means (12) and corrects a rotation angle calculated in the rotation angle calculation section (10) by using the extracted correction values.

The rotation angle sensor (1) as defined above, wherein the rotation angle calculation section (10) comprises a relative rotation angle calculation portion (10a) for calculating a relative rotation angle within an angular range in which a given magnetic pole (6) or a given pair of magnetic poles (6) faces the magnetic field sensor (4), and the rotation angle correcting section (13) is configured to correct the relative rotation angle calculated in the relative rotation angle calculation portion (10a) by using the correction values.

The rotation angle sensor (1) as previously defined, wherein the correction value storage section (11) previously stores an error relation between a rotation angle calculated by the rotation angle calculation section (10) and an actual rotation angle for each of the angular range, approximates the relation by a straight line, and stores a correction coefficient and a correction intercept as the correction values, the correction coefficient being set such that the approximate line has a slope of 0 and the correction intercept being set such that an intercept of the approximate line is 0, and wherein the rotation angle correcting section (13) is configured to correct the relative rotation angle by multiplying the relative rotation angle calculated by the relative rotation angle calculation portion (10a) by the correction coefficient and adding the correction intercept.

The rotation angle sensor (1) as previously defined wherein the facing magnetic pole detecting means (12) is configured to detect a rotation period that defines what number periodic change in the magnetic field strength detected by the magnetic field sensor (4) from a reference position as a reference of the rotation angle of the rotating shaft (2), and wherein the rotation angle calculation section (10) comprises an absolute rotation angle calculation portion (10a) that calculates a rotation angle from the reference position of the rotating shaft (2) based on the rotation period detected by the facing magnetic pole detecting means (12) and the relative rotation angle corrected by the rotation angle correcting section (13).

The rotation angle sensor (1) as previously defined, wherein the correction value storage section (11) preliminarily stores correction values for each pair of magnetic poles (6) facing the magnetic field sensor (4), wherein the facing magnetic pole detecting means (12) is configured to detect the pair of magnetic poles (6) facing the magnetic field sensor (4), and wherein the rotation angle correcting section (13) is configured to extract correction values corresponding to the pair of magnetic poles (6) detected by the facing magnetic pole detecting means (12) and to correct a rotation angle calculated in the rotation angle calculation section (10) by using the extracted correction values.

A correction method for a rotation angle sensor (1), wherein the rotation angle sensor (1) comprises: a ring magnet (3) that is provided around a rotating shaft (2) subjected to rotation angle detection so as to be integrally rotated with the rotating shaft (2) and is magnetized so as to have not less than one pair of magnetic poles (6) with different polarities in a circumferential direction; a magnetic field sensor (4) that is provided so as to face the ring magnet (3) in a radial direction of the rotating shaft (2) and detects magnetic field strengths in radial and tangent directions of the rotating shaft (2); and a rotation angle calculation section (10) that calculates a rotation angle of the rotating shaft (2) based on the magnetic field strengths detected by the magnetic field sensor (4), the method comprising: preliminarily setting correction values for each magnetic pole (6) or each pair of magnetic poles (6) facing the magnetic field sensor (4); and detecting the magnetic pole (6) or the pair of magnetic poles (6) facing the magnetic field sensor (4) and correcting a rotation angle calculated by the rotation angle calculation section (10) by using correction values corresponding to the detected magnetic pole (6) or the detected pair of magnetic poles (6).

The method defined in the previous paragraph, wherein the rotation angle calculation section (10) comprises a relative rotation angle calculation portion (10*a*) for calculating a relative rotation angle within an angular range in which a given magnetic pole (6) or a given pair of magnetic poles (6) faces the magnetic field sensor (4), and wherein the relative rotation angle calculated by the relative rotation angle calculation portion (10*a*) is corrected by using the correction values.

The method previously defined, further comprising: previously storing an error relation between a relative rotation angle calculated by the relative rotation angle calculation portion (10*a*) and an actual rotation angle for each angular range, approximating the relation by a straight line, and storing a correction coefficient and a correction intercept as the correction values, the correction coefficient being set such that the approximate line has a slope of 0 and the correction intercept being set such that an intercept of the approximate line is 0; and correcting the relative rotation angle by multiplying the relative rotation angle calculated by the relative rotation angle calculation portion (10*a*) by the correction coefficient and adding the correction intercept.

The method previously defined, further comprising: detecting a rotation period that defines what number periodic change in the magnetic field strength detected by the magnetic field sensor (4) from a reference position as a reference of the rotation angle of the rotating shaft (2); and calculating a rotation angle from the reference position of the rotating shaft (2) based on the detected rotation period and the corrected relative rotation angle.

The method previously defined, comprising: preliminarily storing correction values for each pair of magnetic poles (6) facing the magnetic field sensor (4); detecting the pair of magnetic poles (6) facing the magnetic field sensor (4); and correcting the rotation angle calculated by the rotation angle calculation section (10) by using the correction values corresponding to the detected pair of magnetic poles (6).

Although the embodiment of the invention has been described, the invention according to claims is not to be limited to the embodiment. Further, please note that all combinations of the features described in the embodiment are not necessary to solve the problem of the invention.

The invention can be appropriately modified and implemented without departing from the gist thereof.

What is claimed is:

1. A rotation angle sensor, comprising:
a ring magnet that is provided around a rotating shaft subjected to rotation angle detection so as to be integrally rotated with the rotating shaft and is magnetized so as to have not less than one pair of magnetic poles with different polarities arranged in a circumferential direction;
a magnetic field sensor that is provided so as to face the ring magnet in a radial direction of the rotating shaft and detects magnetic field strengths in radial and tangent directions of the rotating shaft;
a rotation angle calculation section that calculates a rotation angle of the rotating shaft based on the magnetic field strengths detected by the magnetic field sensor;
a correction value storage section that stores correction values preliminarily set for each magnetic pole, or each pair of magnetic poles, facing the magnetic field sensor;
a facing magnetic pole detecting means that detects the magnetic pole or the pair of magnetic poles facing the magnetic field sensor; and
a rotation angle correcting section that refers to the correction value storage section, extracts correction values corresponding to the magnetic pole or the pair of magnetic poles detected by the facing magnetic pole detecting means, and corrects a rotation angle calculated in the rotation angle calculation section by using the extracted correction values,
wherein the rotation angle calculation section comprises a relative rotation angle calculation portion for calculating a relative rotation angle within an angular range in which a given magnetic pole or a given pair of magnetic poles faces the magnetic field sensor,
wherein the rotation angle correcting section is configured to correct the relative rotation angle calculated by the relative rotation angle calculation portion by using the correction values,
wherein the correction value storage section previously stores an error relation between a rotation angle calculated by the rotation angle calculation section and an actual rotation angle for each of the angular range, approximates the relation by a straight line, and stores a correction coefficient and a correction intercept as the correction values, the correction coefficient being set such that the approximate line has a slope of 0 and the correction intercept being set such that an intercept of the approximate line is 0, and
wherein the rotation angle correcting section is configured to correct the relative rotation angle by multiplying the relative rotation angle calculated by the relative rotation angle calculation portion by the correction coefficient and adding the correction intercept.

2. The rotation angle sensor according to claim 1,
wherein the facing magnetic pole detecting means is configured to detect a rotation period that defines what number periodic change in the magnetic field strength detected by the magnetic field sensor from a reference position as a reference of the rotation angle of the rotating shaft, and
wherein the rotation angle calculation section comprises an absolute rotation angle calculation portion that calculates a rotation angle from the reference position of the rotating shaft based on the rotation period detected by the facing magnetic pole detecting means and the relative rotation angle corrected by the rotation angle correcting section.

3. The rotation angle sensor according to claim 2,
wherein the correction value storage section preliminarily stores correction values for each pair of magnetic poles facing the magnetic field sensor,
wherein the facing magnetic pole detecting means is configured to detect the pair of magnetic poles facing the magnetic field sensor, and
wherein the rotation angle correcting section is configured to extract correction values corresponding to the pair of magnetic poles detected by the facing magnetic pole detecting means and to correct the rotation angle calculated by the rotation angle calculation section by using the extracted correction values.

4. The rotation angle sensor according to claim 1,
wherein the correction value storage section preliminarily stores correction values for each pair of magnetic poles facing the magnetic field sensor,
wherein the facing magnetic pole detecting means is configured to detect the pair of magnetic poles facing the magnetic field sensor, and
wherein the rotation angle correcting section is configured to extract correction values corresponding to the pair of magnetic poles detected by the facing magnetic pole detecting means and to correct the rotation angle calculated by the rotation angle calculation section by using the extracted correction values.

5. A rotation angle sensor, comprising:
a ring magnet that is provided around a rotating shaft subjected to rotation angle detection so as to be integrally rotated with the rotating shaft and is magnetized so as to have not less than one pair of magnetic poles with different polarities arranged in a circumferential direction;
a magnetic field sensor that is provided so as to face the ring magnet in a radial direction of the rotating shaft and detects magnetic field strengths in radial and tangent directions of the rotating shaft;
a rotation angle calculation section that calculates a rotation angle of the rotating shaft based on the magnetic field strengths detected by the magnetic field sensor;
a correction value storage section that stores correction values preliminarily set for each magnetic pole, or each pair of magnetic poles, facing the magnetic field sensor;
a facing magnetic pole detecting means that detects the magnetic pole or the pair of magnetic poles facing the magnetic field sensor; and
a rotation angle correcting section that refers to the correction value storage section, extracts correction values corresponding to the magnetic pole or the pair of magnetic poles detected by the facing magnetic pole detecting means, and corrects a rotation angle calculated in the rotation angle calculation section by using the extracted correction values,
wherein the rotation angle calculation section comprises a relative rotation angle calculation portion for calculating a relative rotation angle within an angular range in which a given magnetic pole or a given pair of magnetic poles faces the magnetic field sensor,
wherein the rotation angle correcting section is configured to correct the relative rotation angle calculated by the relative rotation angle calculation portion by using the correction values,
wherein the facing magnetic pole detecting means is configured to detect a rotation period that defines what number periodic change in the magnetic field strength detected by the magnetic field sensor from a reference position as a reference of the rotation angle of the rotating shaft, and
wherein the rotation angle calculation section comprises an absolute rotation angle calculation portion that calculates a rotation angle from the reference position of the rotating shaft based on the rotation period detected by the facing magnetic pole detecting means and the relative rotation angle corrected by the rotation angle correcting section.

6. The rotation angle sensor according to claim 5,
wherein the correction value storage section preliminarily stores correction values for each pair of magnetic poles facing the magnetic field sensor,
wherein the facing magnetic pole detecting means is configured to detect the pair of magnetic poles facing the magnetic field sensor, and
wherein the rotation angle correcting section is configured to extract correction values corresponding to the pair of magnetic poles detected by the facing magnetic pole detecting means and to correct the rotation angle calculated by the rotation angle calculation section by using the extracted correction values.

7. A rotation angle sensor, comprising:
a ring magnet that is provided around a rotating shaft subjected to rotation angle detection so as to be integrally rotated with the rotating shaft and is magnetized so as to have not less than one pair of magnetic poles with different polarities arranged in a circumferential direction;
a magnetic field sensor that is provided so as to face the ring magnet in a radial direction of the rotating shaft and detects magnetic field strengths in radial and tangent directions of the rotating shaft;
a rotation angle calculation section that calculates a rotation angle of the rotating shaft based on the magnetic field strengths detected by the magnetic field sensor;
a correction value storage section that stores correction values preliminarily set for each magnetic pole, or each pair of magnetic poles, facing the magnetic field sensor;
a facing magnetic pole detecting means that detects the magnetic pole or the pair of magnetic poles facing the magnetic field sensor; and
a rotation angle correcting section that refers to the correction value storage section, extracts correction values corresponding to the magnetic pole or the pair of magnetic poles detected by the facing magnetic pole detecting means, and corrects a rotation angle calculated in the rotation angle calculation section by using the extracted correction values, wherein the correction value storage section preliminarily stores correction values for each pair of magnetic poles facing the magnetic field sensor, wherein the facing magnetic pole detecting means is configured to detect the pair of magnetic poles facing the magnetic field sensor, and wherein the rotation angle correcting section is configured to extract correction values corresponding to the pair of magnetic poles detected by the facing magnetic pole detecting means and to correct the rotation angle calculated by the rotation angle calculation section by using the extracted correction values.

8. A correction method for a rotation angle sensor, wherein the rotation angle sensor comprises: a ring magnet that is provided around a rotating shaft subjected to rotation angle detection so as to be integrally rotated with the rotating shaft and is magnetized so as to have not less than one pair of magnetic poles with different polarities arranged in a circumferential direction; a magnetic field sensor that is provided so as to face the ring magnet in a radial direction of the rotating shaft and detects magnetic field strengths in radial and tangent directions of the rotating shaft; and a rotation angle calculation section that calculates a rotation angle of the rotating shaft based on the magnetic field strengths detected by the magnetic field sensor, wherein the rotation angle calculation section comprises a relative rotation angle calculation portion for calculating a relative rotation angle within an angular range in which a given magnetic pole or a given pair of magnetic poles faces the magnetic field sensor, and wherein the relative rotation angle calculated by the relative rotation angle calculation portion is corrected by using the correction values, the method comprising:
preliminarily setting correction values for each magnetic pole, or each pair of magnetic poles, facing the magnetic field sensor;
detecting the magnetic pole or the pair of magnetic poles facing the magnetic field sensor and correcting a rotation angle calculated by the rotation angle calculation section by using correction values corresponding to the detected magnetic pole or the detected pair of magnetic poles;
previously storing an error relation between a relative rotation angle calculated by the relative rotation angle calculation portion and an actual rotation angle for each angular range;
approximating the relation by a straight line;
storing a correction coefficient and a correction intercept as the correction values, the correction coefficient being set such that the approximate line has a slope of 0 and the correction intercept being set such that an intercept of the approximate line is 0; and
correcting the relative rotation angle by multiplying the relative rotation angle calculated by the relative rotation angle calculation portion by the correction coefficient and adding the correction intercept.

9. The method according to claim 8, further comprising:
detecting a rotation period that defines what number periodic change in the magnetic field strength detected by the magnetic field sensor from a reference position as a reference of the rotation angle of the rotating shaft; and
calculating a rotation angle from the reference position of the rotating shaft based on the detected rotation period and the corrected relative rotation angle.

10. The method according to claim 9, further comprising:
preliminarily storing correction values for each pair of magnetic poles facing the magnetic field sensor;
detecting the pair of magnetic poles facing the magnetic field sensor; and
correcting the rotation angle calculated by the rotation angle calculation section by using the correction values corresponding to the detected pair of magnetic poles.

11. The method according to claim 8, further comprising:
preliminarily storing correction values for each pair of magnetic poles facing the magnetic field sensor;
detecting the pair of magnetic poles facing the magnetic field sensor; and
correcting the rotation angle calculated by the rotation angle calculation section by using the correction values corresponding to the detected pair of magnetic poles.

12. A correction method for a rotation angle sensor, wherein the rotation angle sensor comprises: a ring magnet that is provided around a rotating shaft subjected to rotation angle detection so as to be integrally rotated with the rotating shaft and is magnetized so as to have not less than one pair of magnetic poles with different polarities arranged in a circumferential direction; a magnetic field sensor that is provided so as to face the ring magnet in a radial direction of the rotating shaft and detects magnetic field strengths in radial and tangent directions of the rotating shaft; and a rotation angle calculation section that calculates a rotation angle of the rotating shaft based on the magnetic field strengths detected by the magnetic field sensor, wherein the rotation angle calculation section comprises a relative rotation angle calculation portion for calculating a relative rotation angle within an angular range in which a given magnetic pole or a given pair of magnetic poles faces the magnetic field sensor, and wherein the relative rotation angle calculated by the relative rotation angle calculation portion is corrected by using the correction values, the method comprising:
preliminarily setting correction values for each magnetic pole, or each pair of magnetic poles, facing the magnetic field sensor;
detecting the magnetic pole or the pair of magnetic poles facing the magnetic field sensor and correcting a rotation angle calculated by the rotation angle calculation section by using correction values corresponding to the detected magnetic pole or the detected pair of magnetic poles;
detecting a rotation period that defines what number periodic change in the magnetic field strength detected by the magnetic field sensor from a reference position as a reference of the rotation angle of the rotating shaft; and
calculating a rotation angle from the reference position of the rotating shaft based on the detected rotation period and the corrected relative rotation angle.

13. The method according to claim 12, further comprising:
preliminarily storing correction values for each pair of magnetic poles facing the magnetic field sensor;
detecting the pair of magnetic poles facing the magnetic field sensor; and
correcting the rotation angle calculated by the rotation angle calculation section by using the correction values corresponding to the detected pair of magnetic poles.

14. A correction method for a rotation angle sensor, wherein the rotation angle sensor comprises: a ring magnet that is provided around a rotating shaft subjected to rotation angle detection so as to be integrally rotated with the rotating shaft and is magnetized so as to have not less than one pair of magnetic poles with different polarities arranged in a circumferential direction; a magnetic field sensor that is provided so as to face the ring magnet in a radial direction of the rotating shaft and detects magnetic field strengths in radial and tangent directions of the rotating shaft; and a rotation angle calculation section that calculates a rotation angle of the rotating shaft based on the magnetic field strengths detected by the magnetic field sensor, the method comprising:
  preliminarily setting correction values for each magnetic pole, or each pair of magnetic poles, facing the magnetic field sensor;
  detecting the magnetic pole or the pair of magnetic poles facing the magnetic field sensor and correcting a rotation angle calculated by the rotation angle calculation section by using correction values corresponding to the detected magnetic pole or the detected pair of magnetic poles;
  preliminarily storing correction values for each pair of magnetic poles facing the magnetic field sensor;
  detecting the pair of magnetic poles facing the magnetic field sensor; and
  correcting the rotation angle calculated by the rotation angle calculation section by using the correction values corresponding to the detected pair of magnetic poles.

15. A rotation angle sensor, comprising:
  a ring magnet that is provided around a rotating shaft subjected to rotation angle detection so as to be integrally rotated with the rotating shaft and is magnetized so as to have not less than one pair of magnetic poles with different polarities arranged in a circumferential direction;
  a magnetic field sensor that is provided so as to face the ring magnet in a radial direction of the rotating shaft and detects magnetic field strengths in radial and tangent directions of the rotating shaft;
  a rotation angle calculation section that calculates a rotation angle of the rotating shaft based on the magnetic field strengths detected by the magnetic field sensor;
  a correction value storage section that stores correction values preliminarily set for each magnetic pole, or each pair of magnetic poles, facing the magnetic field sensor;
  a facing magnetic pole detecting means that detects the magnetic pole or the pair of magnetic poles facing the magnetic field sensor; and
  a rotation angle correcting section that refers to the correction value storage section, extracts correction values corresponding to the magnetic pole or the pair of magnetic poles detected by the facing magnetic pole detecting means, and corrects a rotation angle calculated in the rotation angle calculation section by using the extracted correction values,
  wherein the rotation angle calculation section comprises a relative rotation angle calculation portion for calculating a relative rotation angle within an angular range in which a given magnetic pole or a given pair of magnetic poles faces the magnetic field sensor,
  wherein the rotation angle correcting section is configured to correct the relative rotation angle calculated by the relative rotation angle calculation portion by using the correction values,
  wherein the correction value storage section preliminarily stores correction values for each pair of magnetic poles facing the magnetic field sensor,
  wherein the facing magnetic pole detecting means is configured to detect the pair of magnetic poles facing the magnetic field sensor, and
  wherein the rotation angle correcting section is configured to extract correction values corresponding to the pair of magnetic poles detected by the facing magnetic pole detecting means and to correct the rotation angle calculated by the rotation angle calculation section by using the extracted correction values.

16. A correction method for a rotation angle sensor, wherein the rotation angle sensor comprises: a ring magnet that is provided around a rotating shaft subjected to rotation angle detection so as to be integrally rotated with the rotating shaft and is magnetized so as to have not less than one pair of magnetic poles with different polarities arranged in a circumferential direction; a magnetic field sensor that is provided so as to face the ring magnet in a radial direction of the rotating shaft and detects magnetic field strengths in radial and tangent directions of the rotating shaft; and a rotation angle calculation section that calculates a rotation angle of the rotating shaft based on the magnetic field strengths detected by the magnetic field sensor,
  wherein the rotation angle calculation section comprises a relative rotation angle calculation portion for calculating a relative rotation angle within an angular range in which a given magnetic pole or a given pair of magnetic poles faces the magnetic field sensor, and
  wherein the relative rotation angle calculated by the relative rotation angle calculation portion is corrected by using the correction values,
the method comprising:
  preliminarily setting correction values for each magnetic pole, or each pair of magnetic poles, facing the magnetic field sensor;
  detecting the magnetic pole or the pair of magnetic poles facing the magnetic field sensor and correcting a rotation angle calculated by the rotation angle calculation section by using correction values corresponding to the detected magnetic pole or the detected pair of magnetic poles;
  preliminarily storing correction values for each pair of magnetic poles facing the magnetic field sensor;
  detecting the pair of magnetic poles facing the magnetic field sensor; and
  correcting the rotation angle calculated by the rotation angle calculation section by using the correction values corresponding to the detected pair of magnetic poles.

* * * * *